US006655673B2

(12) United States Patent
Colby

(10) Patent No.: US 6,655,673 B2
(45) Date of Patent: Dec. 2, 2003

(54) POWER CLAMP MECHANISM

(75) Inventor: Douglas D. Colby, Clarkston, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 19 days.

(21) Appl. No.: 09/956,231

(22) Filed: Sep. 19, 2001

(65) Prior Publication Data

US 2002/0043751 A1 Apr. 18, 2002

Related U.S. Application Data

(60) Provisional application No. 60/240,738, filed on Oct. 16, 2000.

(51) Int. Cl.[7] ..................................... B23Q 3/08

(52) U.S. Cl. ..................... 269/32; 269/903; 269/233; 269/94

(58) Field of Search ......................... 269/32, 27, 24, 269/285, 239, 228, 97, 93, 94; 384/15

(56) References Cited

U.S. PATENT DOCUMENTS

| | | | | |
|---|---|---|---|---|
| 4,396,183 A | | 8/1983 | Lymburner | 269/32 |
| 4,570,914 A | | 2/1986 | Blatt | 269/32 |
| 4,778,163 A | | 10/1988 | Spear | 269/32 |
| 5,460,358 A | | 10/1995 | Sendoykas | 269/32 |
| 5,490,663 A | * | 2/1996 | Stojkovic et al. | 269/32 |
| 5,687,961 A | | 11/1997 | Horn | 269/32 |
| 5,884,903 A | * | 3/1999 | Sawdon | 269/32 |
| 5,975,605 A | | 11/1999 | Kot | 294/115 |
| 5,996,984 A | | 12/1999 | Takahashi | 269/32 |
| 6,003,850 A | | 12/1999 | Crorey | 269/32 |
| 6,059,277 A | | 5/2000 | Sawdon et al. | 269/24 |
| 6,065,743 A | | 5/2000 | Roudier et al. | 269/32 |
| 6,070,864 A | | 6/2000 | Crorey | 269/32 |

* cited by examiner

*Primary Examiner*—George Nguyen
*Assistant Examiner*—Daniel Shanley
(74) *Attorney, Agent, or Firm*—Dinnin & Dunn, P.C.

(57) ABSTRACT

A power clamp apparatus, comprised of, a single metal body with an interior cavity running there through, a unit assembly which is inserted into said interior cavity, and said unit assembly including, a piston for slidable back and forth movement within said cavity, a lower portion of said cavity acting as a chamber for said piston, a piston rod connected to said piston, a floating head member on the piston rod, a link mechanism connected proximate to an upper end of said piston rod, a lower cap member which closes off said cavity near a bottom end of said metal body, an upper cap member which closes off the metal body proximate to a top end thereof after said unit assembly is inserted into said cavity, a drive shaft inserted through apertures in a generally transverse position through said metal body, with a central portion of said drive shaft inside the metal body being connected to an end of said link mechanism, a clamp arm attached to said drive shaft on the outside of said metal body, and wherein when said piston rod attached to said link mechanism is moved from its retracted position to its extended position, it causes the clamp arm to be moved between an open position and a clamped positioned relative to a work piece being clamped.

58 Claims, 9 Drawing Sheets

FIG. 1.
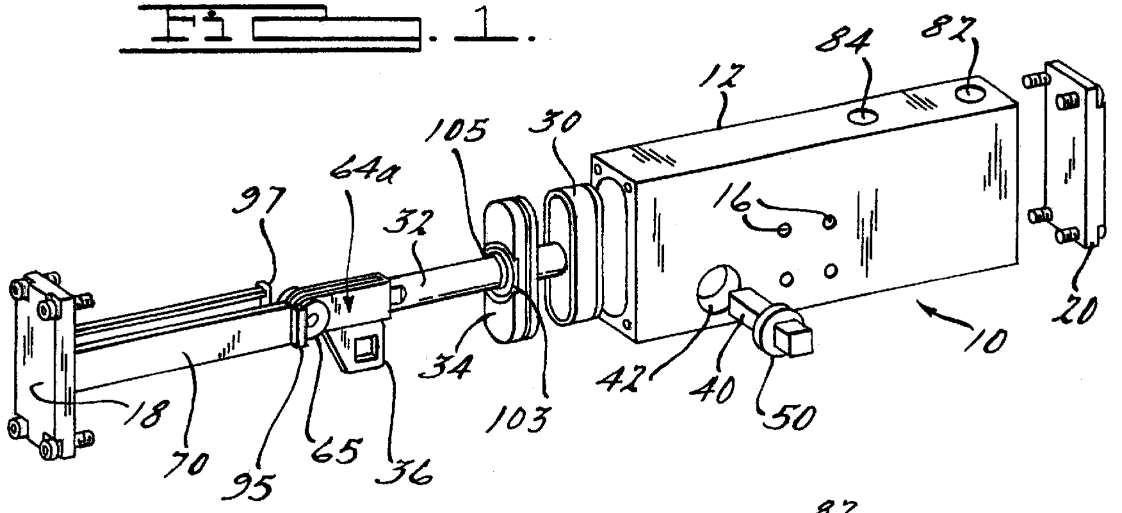
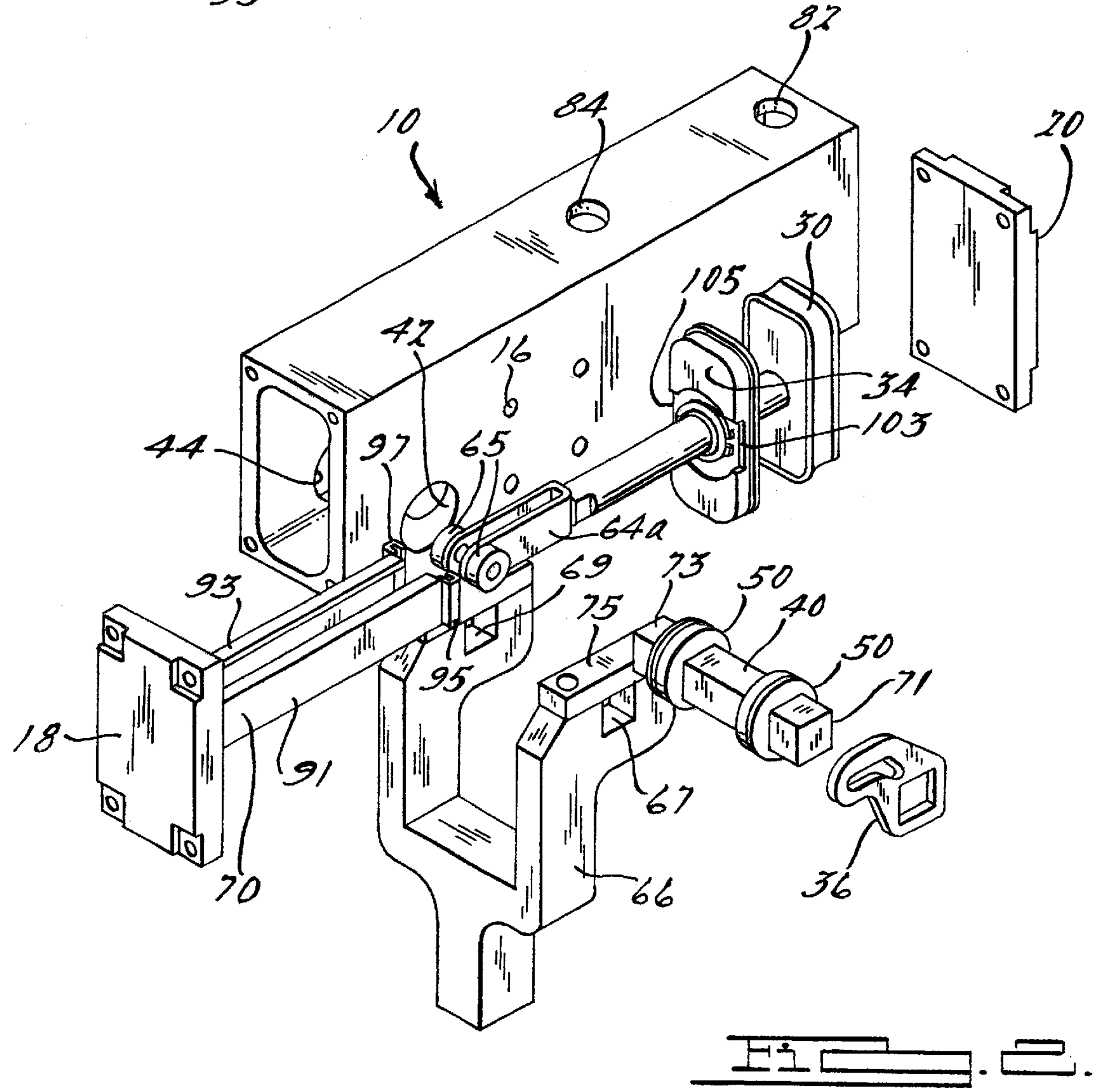
FIG. 2.

FIG. 15.
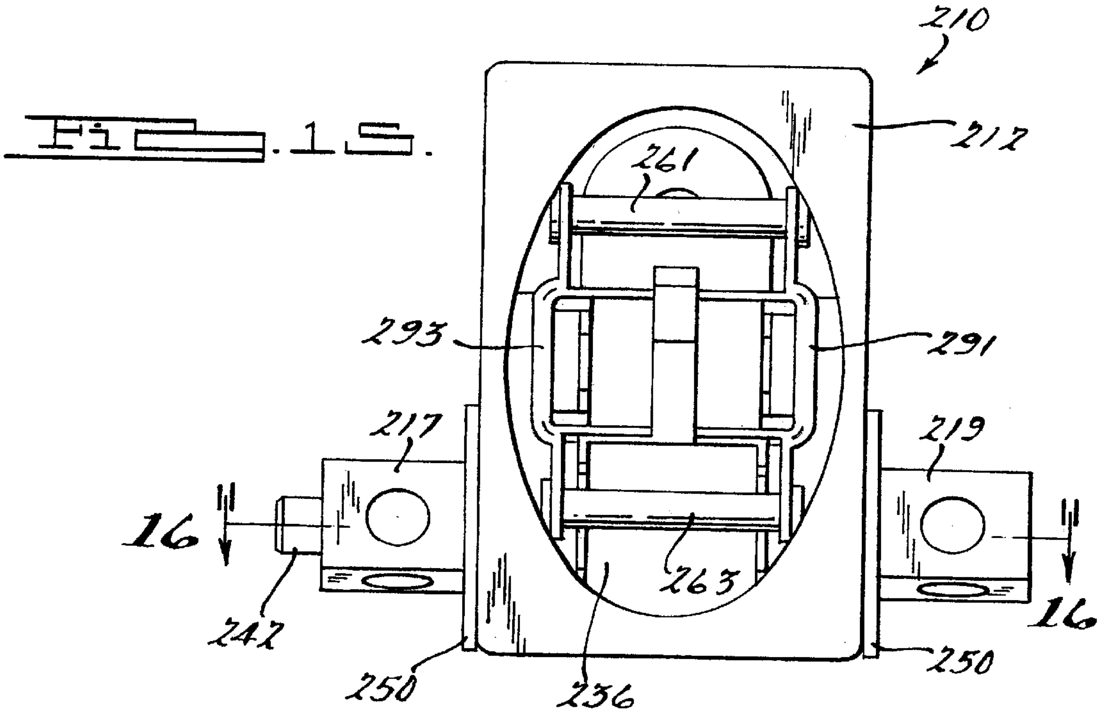
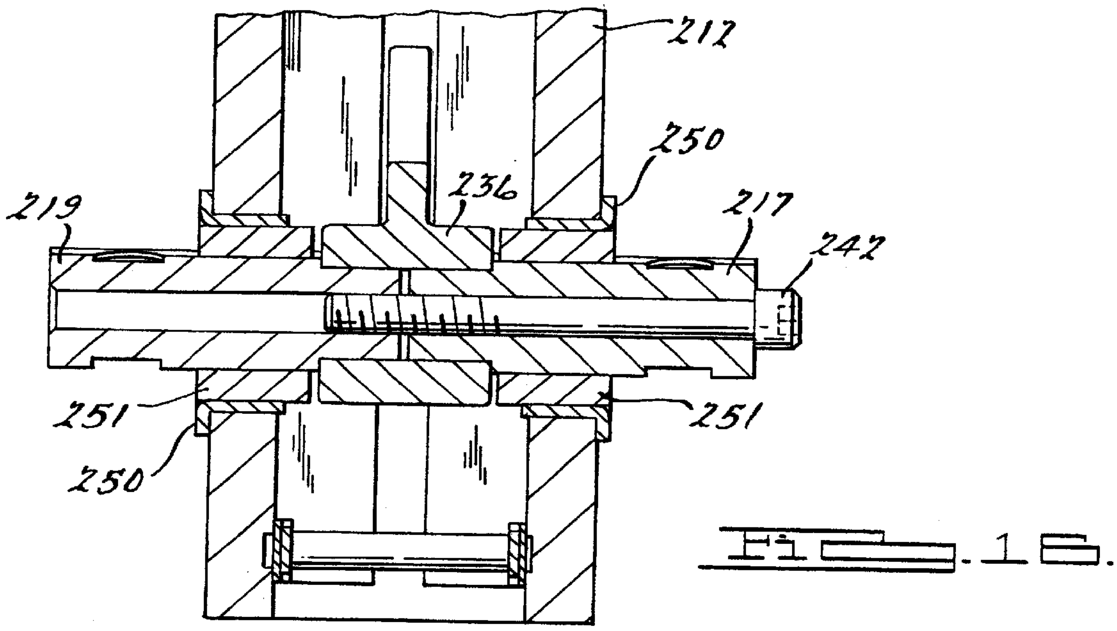
FIG. 16.

POWER CLAMP MECHANISM

This is a continuation of Provisional Application Ser. No. 60/240,738 filed Oct. 16, 2000.

BACKGROUND OF THE INVENTION

This invention broadly relates to a new power clamp mechanism which has unique features and which can be manufactured economically and at low cost. More particularly, this invention relates to a new power clamp mechanism which is made from a single extrusion body.

In the past, power clamping mechanisms have been relatively expensive to manufacture and also have generally required the usage of two separate body components; namely, one body component which houses a piston and piston rod assembly for driving the clamp and a second body component used to house a linkage mechanism which is connected to a clamp arm for opening and closing the clamp arm into a clamped locked position or open position.

Accordingly, it is a primary object of this invention to provide a unique new power clamp mechanism which can be produced at a relatively low cost and which is formed through the use of a single body member.

Another object of the invention is to provide a new power clamp mechanism which is made utilizing a single extruded body for the clamp mechanism and which provides its power locking operation to the clamp arm through the usage of either a wedge lock link mechanism or a toggle link mechanism.

Another object of the present invention is to provide a specially designed power clamp apparatus which utilizes a wedge lock system to move the clamp arm into a closed clamped position.

Another object of the invention is to provide a new power clamp mechanism which utilizes a straight extruded body, with no offsets or doglegs being present in the body of the clamp mechanism.

Another object of the invention is to provide a new power clamp mechanism capable of using at least three different types of clamp arms; namely, a U-arm, a side arm/U-arm, or a regular side arm type clamping bar.

Another object of the invention is to provide a unique new clamp mechanism wherein a unit assembly including a piston, a piston rod, a floating head member, and a link mechanism, are all assembled together prior to being inserted as a unit into the body of the clamp mechanism.

Another object of the invention is to provide a new clamp mechanism wherein a special track mechanism is used to guide the up-and-down movement of the piston rod to thereby provide a technically advanced and uniquely operative clamp mechanism.

Another object of the invention is to provide a novel clamp mechanism which is made using a single metal body and which includes a centrally located push-pull rod (or piston rod) which is generally centered in the middle of that single body, which houses the clamp mechanism, to thereby accomplish uniform force distribution and longevity for the clamp mechanism.

Another object of the invention is to provide a unique and novel clamp mechanism which utilizes a floating head mounted on the rigid tracks, which floating head when fixed in position within the clamp body acts as the upper cylinder head for the chamber (or cavity) within which the piston moves.

Other objects features and advantages of the present invention will become apparent from the subsequent description and the appended claims taken in conjunction with the accompanying drawings.

BRIEF DESCRIPTION OF THE DRAWINGS

FIG. 1 illustrates an exploded view of the power clamp mechanism in accordance with the invention which utilizes a wedge lock linkage mechanism to drive the clamp arm;

FIG. 3 illustrates another exploded view of the invention, basically the same as FIGS. 1–2, except taken from the opposite side thereof and with the track mechanism attached to the floating head;

FIG. 15 shows a top end view of the power clamp according to the second alternate embodiment with the head cap removed.

FIG. 16 shows a cross section taken along line B—B in FIG. 15 of the power clamp according to the second alternate embodiment.

FIG. 18 shows a clamp mechanism with T-slots for mounting.

SUMMARY OF THE INVENTION

Figure 2:
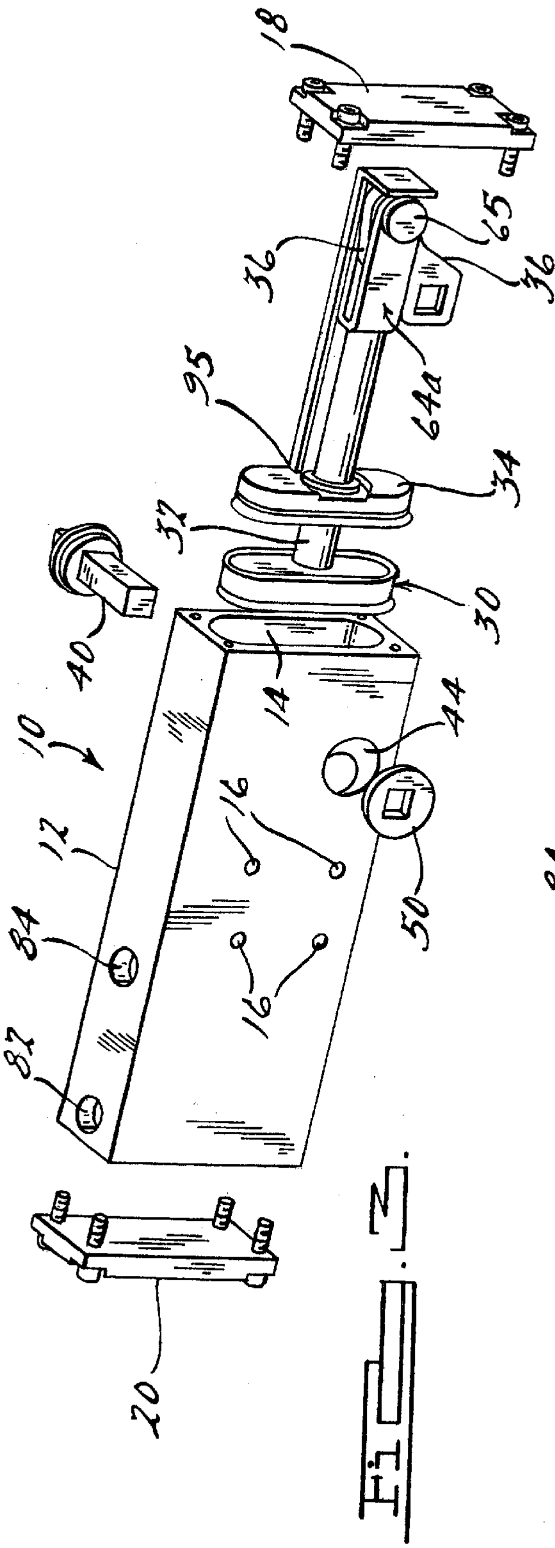
FIG. 2 illustrates another exploded view of the invention illustrating the use of a U-shaped clamp arm.

Briefly stated, the present invention involves a power clamp apparatus comprised of, a single metal body with an interior cavity running there through, a unit assembly which is inserted into said interior cavity, and said unit assembly including, a piston for slidable back and forth movement within said cavity, a lower portion of said cavity acting as a chamber for said piston, a piston rod connected to said piston, a floating head member attached to the rigid tracks, a link mechanism connected proximate to an upper end of said piston rod, a lower cap member which closes off said cavity near a bottom end of said metal body, an upper cap member which closes off the metal body proximate to a top end thereof after said unit assembly is inserted into said cavity, a drive shaft inserted through apertures in a generally transverse position through said metal body, with a central portion of said drive shaft inside the metal body being connected to an end of said link mechanism, a clamp arm attached to said drive shaft on the outside of said metal body, and wherein when said piston rod attached to said link mechanism is moved from its retracted position to its extended position, it causes the clamp arm to be moved between an open position and a clamped positioned relative to a work piece being clamped.

From another aspect, this invention involves a power clamp apparatus comprised of, a single body with an interior cavity running there through, a unit assembly which is inserted into said interior cavity, and said unit assembly including, a piston for slidable back and forth movement within said cavity, a lower portion of said cavity acting as a chamber for said piston, a piston rod connected to said piston, a floating head member through which the piston rod moves, a link mechanism connected proximate to an upper end of said piston rod, a lower cap member which closes off said cavity near a bottom end of said metal body, an upper cap member which closes off the metal body proximate to a top end thereof after said unit assembly is inserted into said cavity, a drive shaft inserted through apertures in a generally transverse position through said metal body, with a central portion of said drive shaft inside the metal body being connected to an end of said link mechanism, a clamp arm attached to said drive shaft on the outside of said metal body, and wherein when said piston rod attached to said link mechanism is moved from its retracted position to its extended position, it causes the clamp arm to be moved between an open position and a clamped positioned relative to a work piece being clamped.

DESCRIPTION OF PREFERRED EMBODIMENTS

The preferred embodiments of the invention are now to be described with reference to the drawings. Like numerals in different drawing figures indicate like elements.

FIGS. 1–7 show various exploded views of the power clamp mechanism designated 10. In the clamp mechanism 10 there is utilized an elongated body member 12 which has a central cavity there through designated 14. The body 12 has numerous holes or apertures therein designated 16, which are used for mounting of the clamp body to a stationary surface (not shown), and which supports the clamp mechanism for working operation thereof. At each end of the clamp body 12 there is positioned a cap member, with the upper cap number being designated 18 and the lower cap number designated 20. The interior of the power clamp mechanism 10 is basically comprised of a piston 30, a piston rod 32, a floating head 34 and a driven plate 36.

The drive shaft 40 is shown in FIGS. 1, 2 and 3, such that the drive shaft is positioned transversely through the two apertures 42 and 44. The drive shaft 40 is typically supported for rotational movement by bearings designated 50. Circular bushings (preferably made of steel or polymer materials) are pressed into the extruded body 12 at the apertures 42 and 44; and, then the metal bearings 50 (preferably sintered) are pushed over the square section drive shaft to mate with and be seated within the steel bushings.

The wedge lock linkage is designated 36. The driven plate 36 or wedge lock linkage mechanism 36 is connected to the upper end of the piston rod 32 through usage of the clevis pin 64. The clevis pin 64 is supported at the upper end of the piston rod 32 by the U-shaped frame member **64*a*, which is mounted at the left end of the piston rod (see FIGS. 1–2). When the piston rod 32 is driven to its full upward position the wedge lock link is driven upwardly to rotate the square cross-section drive shaft such that the clamp arm 66 on the exterior of the clamp mechanism is rotated in a downward direction to thereby closed the clamp arm 66** against a work piece.

The piston 30 is driven in a back and forth direction, that is in an up-and-down direction, through introduction of hydraulic fluid or gases to the chamber 80 through use of the hydraulic inlet and outlet ports 82 and 84.

The clamp arm 66 has its two recesses 67 and 69 placed over the complementary mating end portions 71 and 73 of the square cross-section drive shaft 40, and once the clamp arm recesses 67 and 69 are placed thereover, the fastening plates 75 are secured (with fasteners) across the drive shaft 40 to hold the clamp arm 66 thereon.

The track mechanism is comprised of two tracks 91 and 93. The track members 91 and 93 permit the slidable up-and-down movement of the rolling bearings 65 within the tracks 91 and 93 to properly align the up-and-down movement of the piston rod 32. Also the lower portion of the track members 91 and 93 have small shoulder members 95 and 97 which buttress against the floating head 34 at the receiving ramps 103 and 105 (i.e., complementary receiving shoulder recesses thereon).

Figure 4:
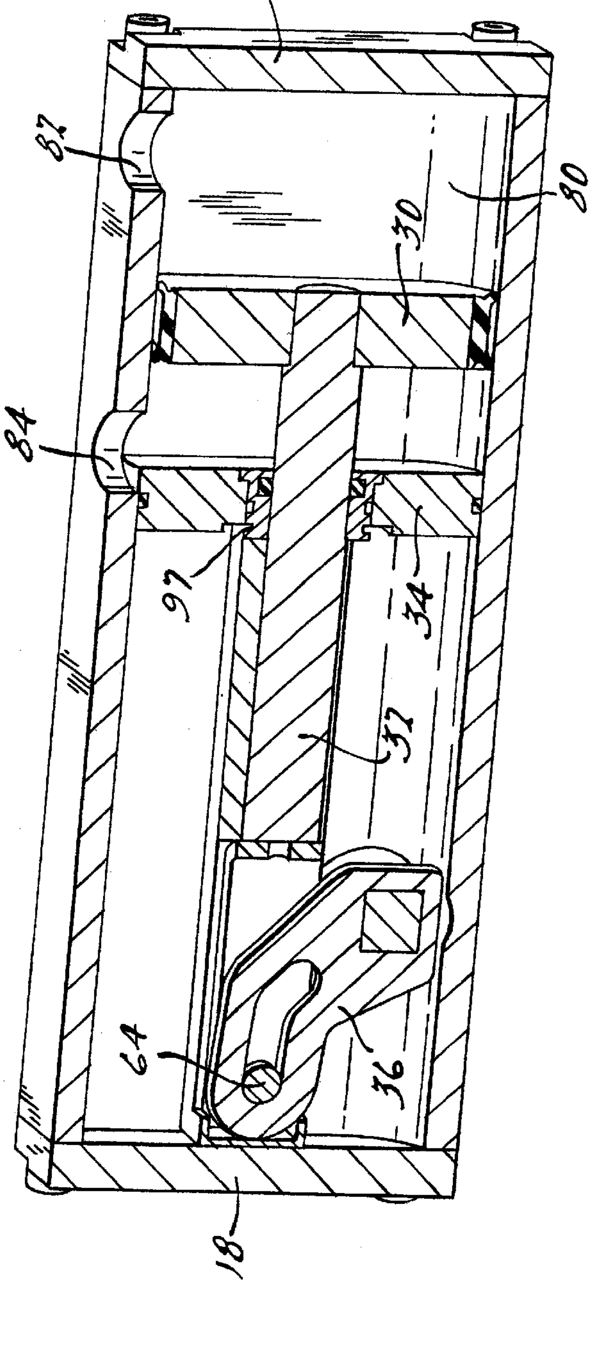
FIG. 4 shows an interior view of the power clamp mechanism of the invention with the piston member being driven near to its top position within its piston chamber.
Figure 5:
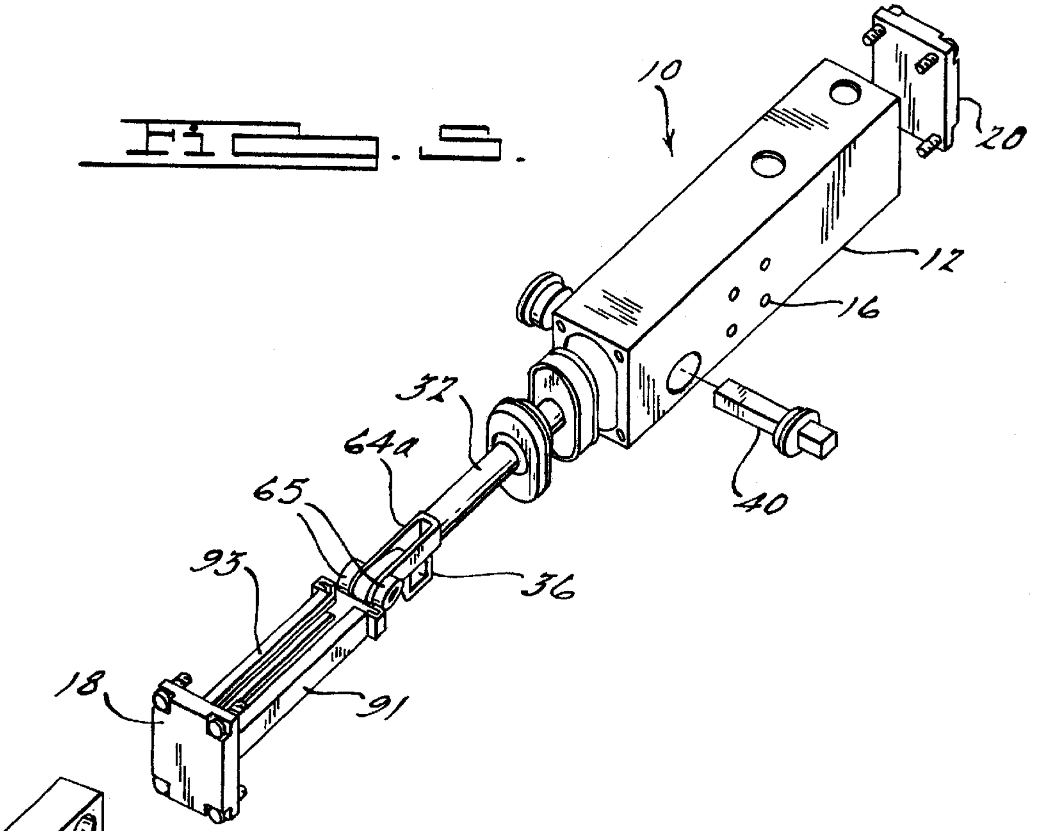
FIG. 5 illustrates a top view of the clamp mechanism of the invention in exploded view format.

Once the internal workings of the clamp mechanism are inserted into the clamp body 12, the track members 91 and 93 buttress up against the receiving ramps 103 and 105 (as best shown in FIG. 4) to position the floating head 34 in a stationary position; and, once so positioned the floating head then acts as the upper head for the piston chamber 80.

Figure 6:
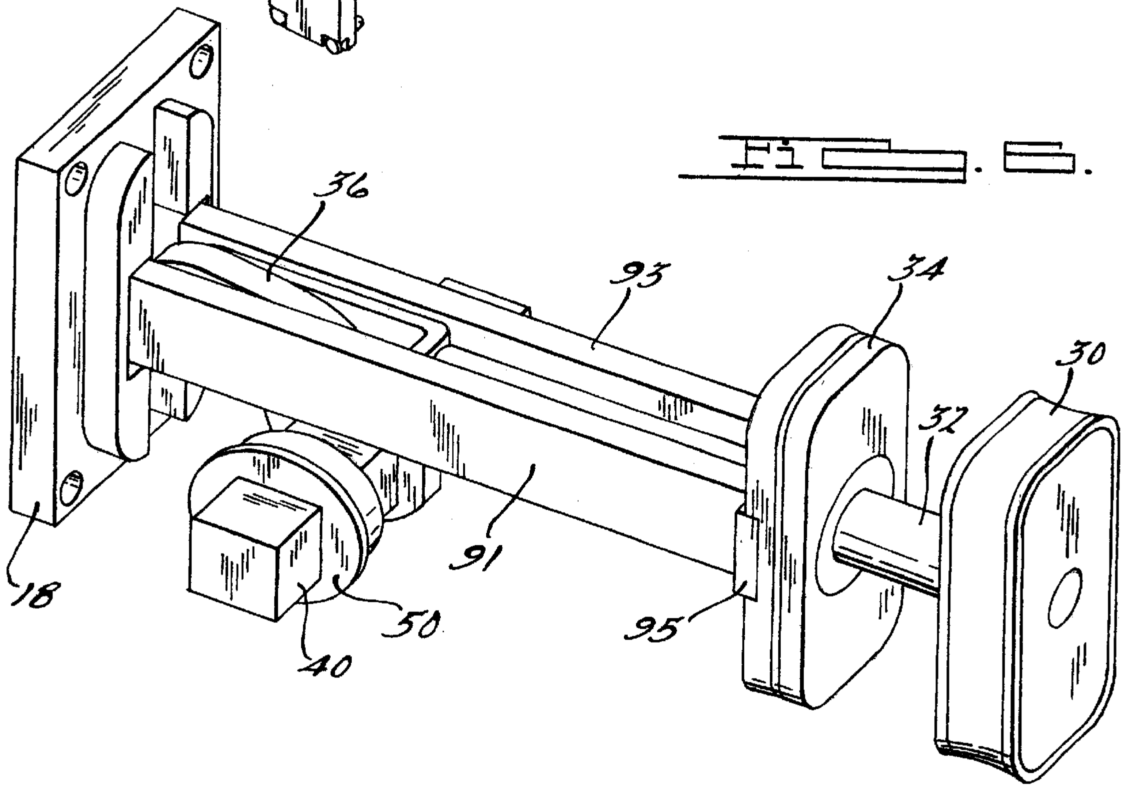
FIG. 6 shows a view of the interior assembly of the clamp mechanism of the invention.

FIG. 6 shows the internal working mechanism in assembled format, such that it is ready for insertion into the body 12, that is, to the interior cavity 14 of the body 12. Once the internal mechanism is inserted, then the drive shaft member 40 is positioned transversely through the openings 42, 44 to link with the wedge lock link mechanism 36.

Figure 7:
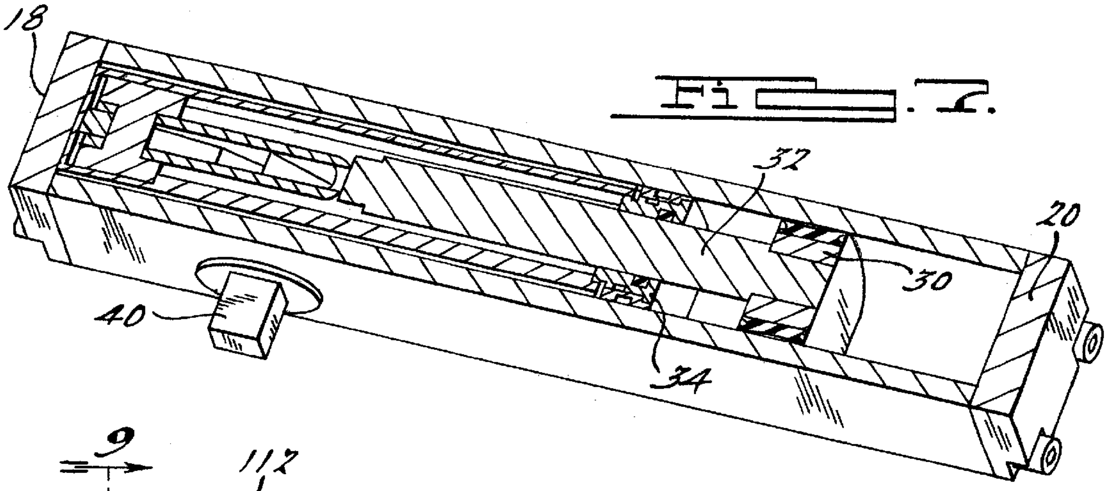
FIG. 7 shows another cross-sectional view of the clamp mechanism of the invention in partially cut-away cross-section.
Figure 8:
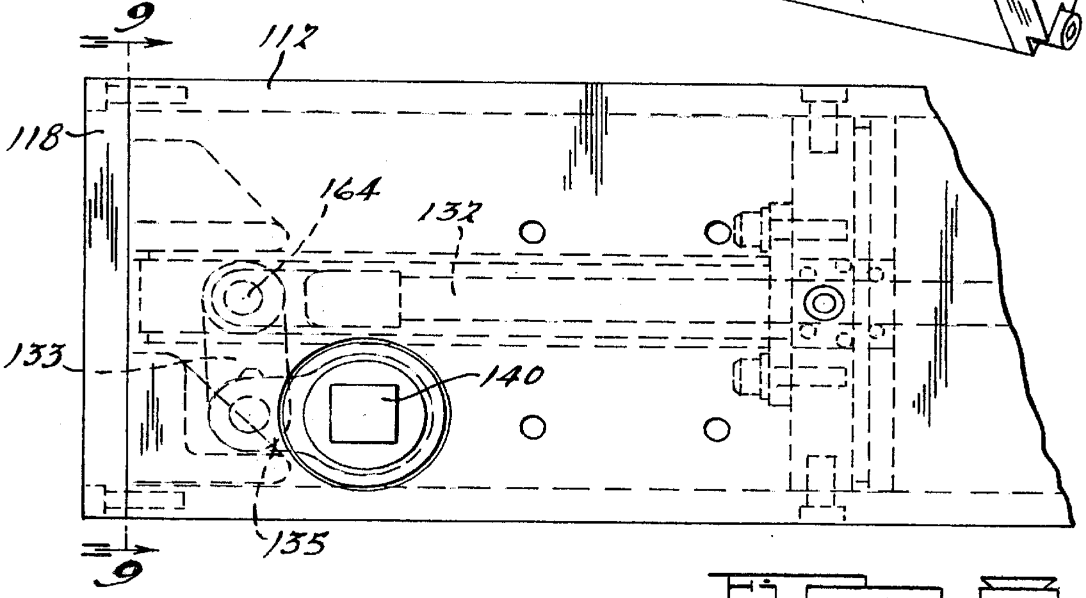
FIG. 8 shows an alternate embodiment of the power clamp mechanism of the invention, which utilizes a toggle linkage mechanism to drive the shaft which rotates the clamp arm.
Figure 9:
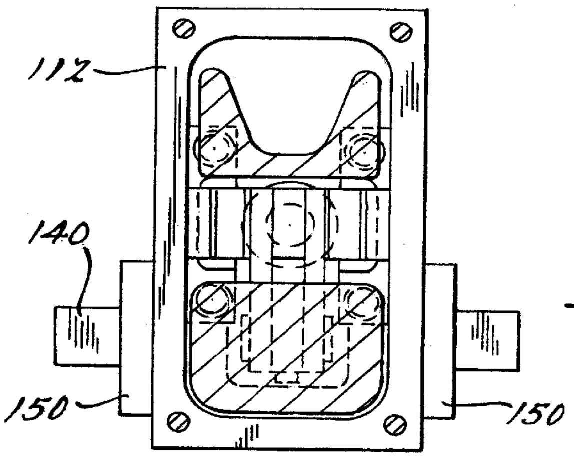
FIG. 9 shows a sectional view taken along the line 9—9 in FIG. 8.
Figure 10:
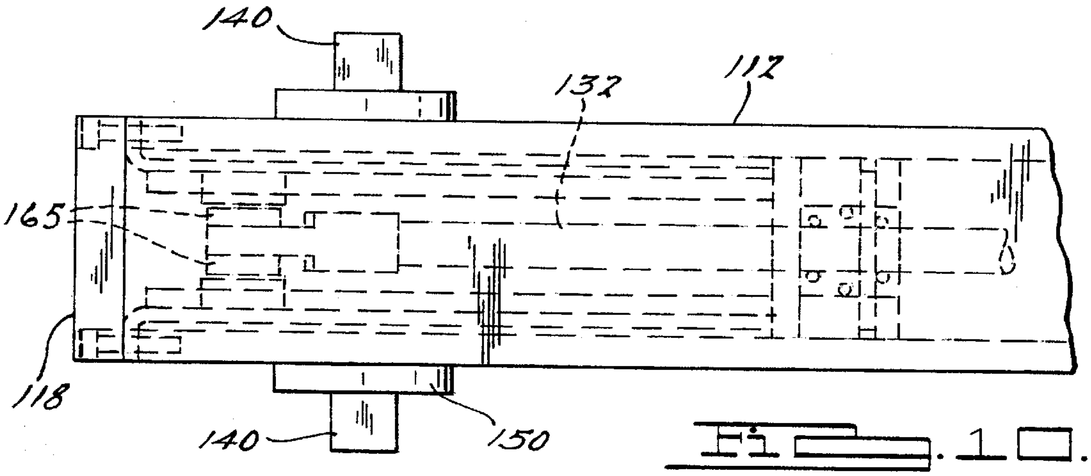
FIG. 10 shows a top view of FIG. 8 partially in phantom view to show the interior workings of the FIG. 8 clamp mechanism.

FIGS. 4 and 7 show cross-sectional views of the clamp mechanism 10, with the unit assembly of FIG. 6 inserted therein, and with the drive shaft 40 being positioned through the transverse holes 42, 44.

Figure 11:
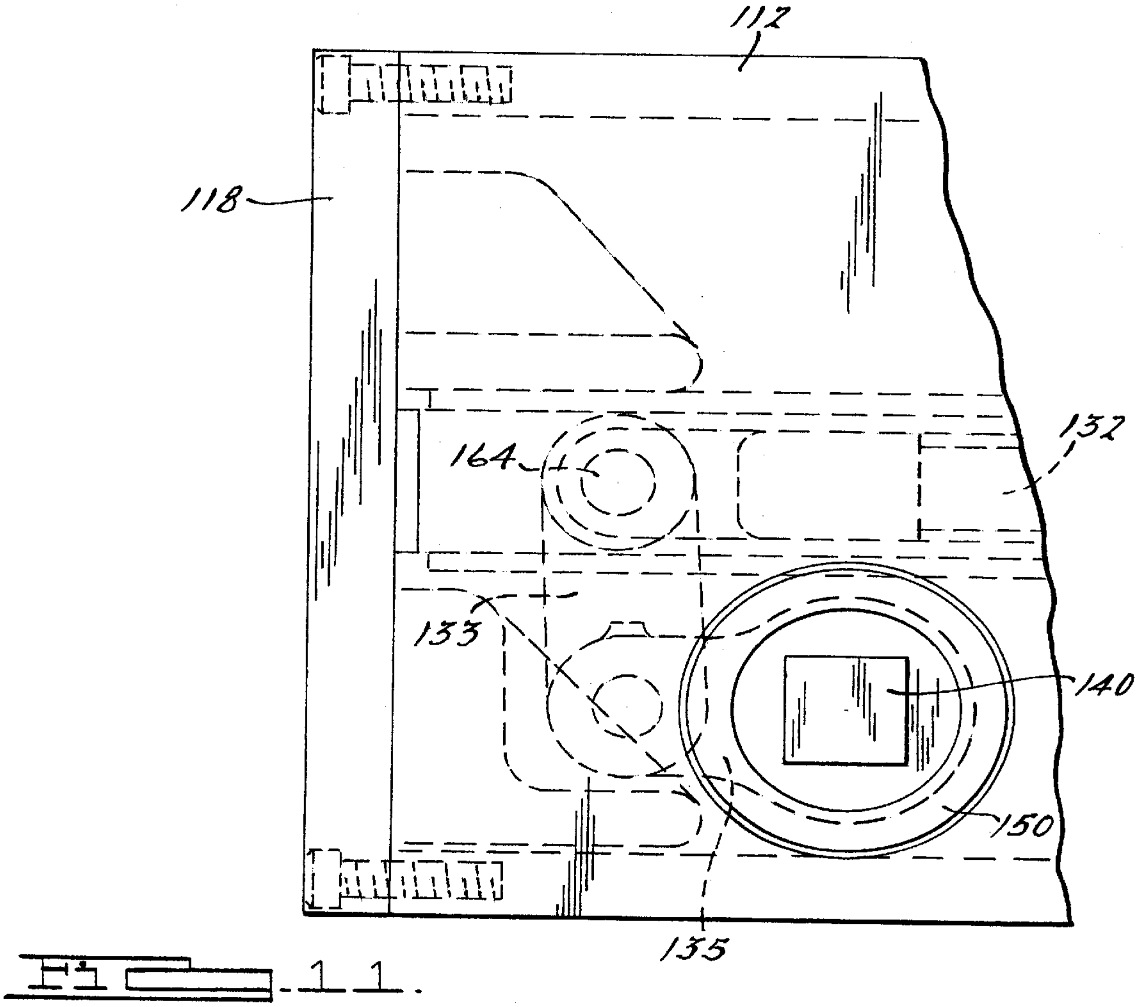
FIG. 11 shows an enlarged view of the left end of FIG. 8, to show more detail of the toggle linkage mechanism used.
Figure 12:
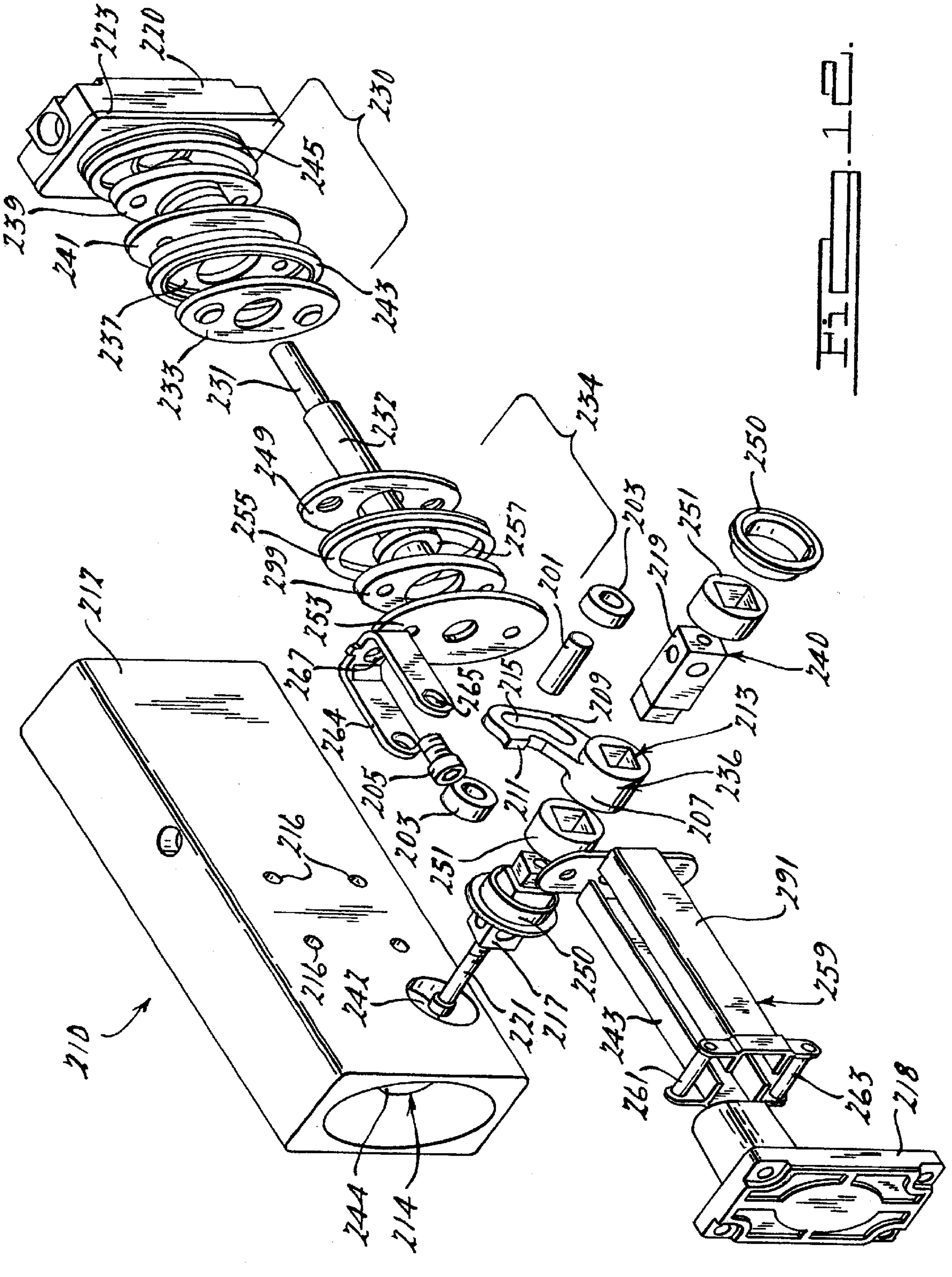
FIG. 12 shows a second alternate embodiment of a power clamp according to the present invention.
Figure 13:
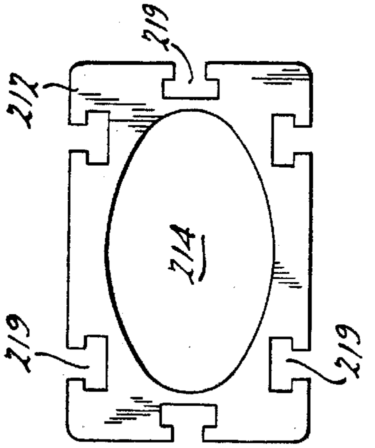
FIG. 13 shows a top end view of the second alternate embodiment of the power clamp.
Figure 12:
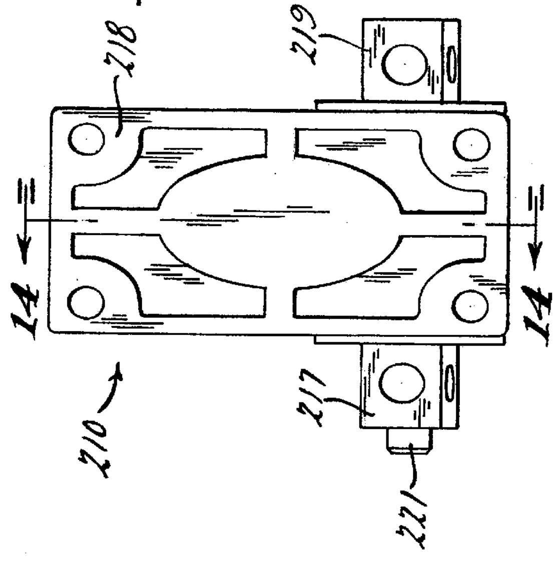
Figure 14:
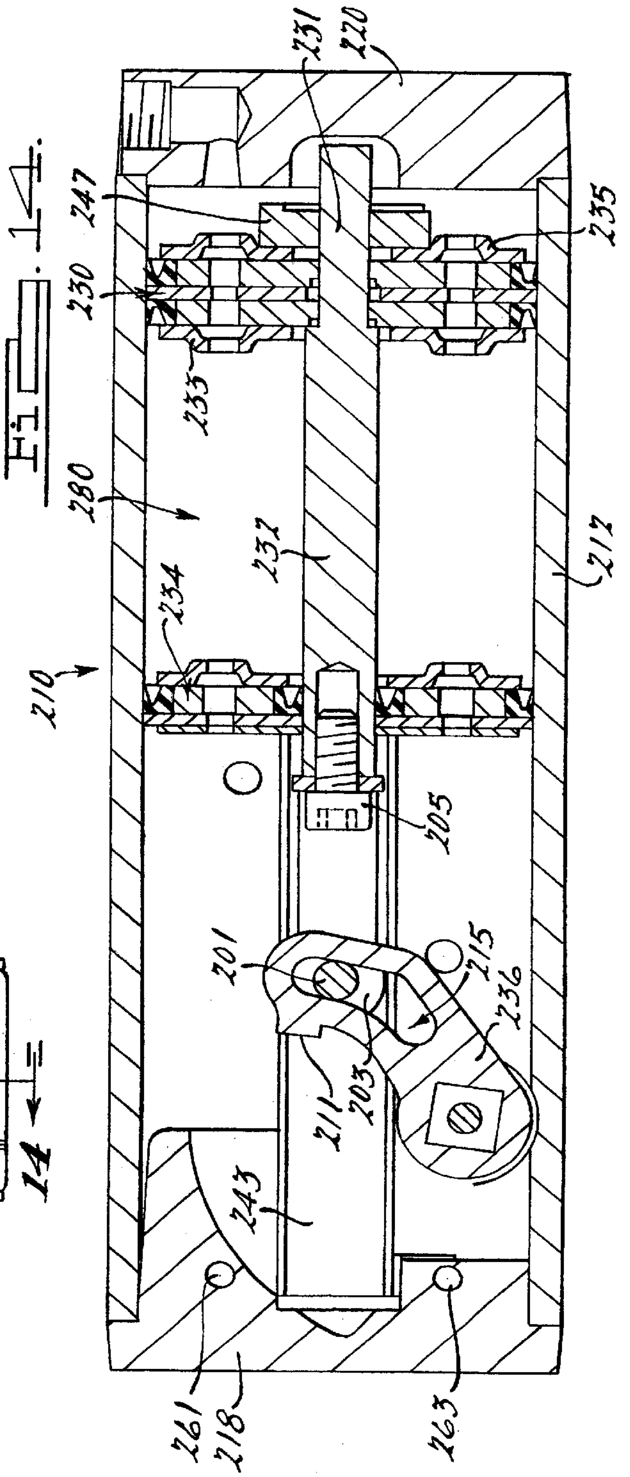
FIG. 14 shows a cross section taken along the line A—A in FIG. 13 of the second alternate embodiment of the power clamp.

FIGS. 8, 9, 10 and 11 show an alternate embodiment of the invention wherein a toggle linkage mechanism is utilized to drive the shaft member 140. In the toggle linkage version of the invention the piston rod 132 is connected to the lower portion of a toggle link 133, which in turn is connected to another toggle link 135. When the piston rod 132 is retracted, or moved in a downward direction, this pulls on the link member 133 to thereby also exert a pulling action on the link 135, which rotates the drive shaft 140 into an open position to thereby open the clamp arm 166 (not shown). Likewise when the piston rod 132 is driven in an upward direction, the link 133 is rotated back to the position as shown in FIG. 11, to thereby force the link 35 to rotate the drive shaft 140, which in turn closes or clamps the clamp arm 66 against a work piece.

Also as shown in FIGS. 8, 9, 10 and 11, the top plate member 118 is of greatly strengthened capacity, as is necessary for the additional forces required when a toggle link mechanism 133, 135 is used in carrying out the invention.

There are many new and advantageous features of the power clamp mechanism disclosed herein. For example, the clamp mechanism of the invention utilizes a metal body with a cavity there through, and preferably this metal body is made from extruded metal. In some alternative embodiments, however, the metal body may be machined. When an extruded body is used, it is a single extruded metal body, instead of a separate body and attached cylinder; and this enables greatly lower cost of manufacturing for the clamp mechanism of the invention. Furthermore, this enables the clamp mechanism of the invention to be light weight and compact which are very important features for automotive tooling components.

As will be shown from the drawings herein, there is porting through the sides of the metal body to permit driving of the piston in an up-an-down movement to thereby power the clamp arm into an open or closed-locked position. There are also direct mounting holes drilled and tapped into the non-pressure portions of the clamp body, which enable the clamp mechanism to be mounted from either side thereof, or from the front and rear portions of the clamp mechanism as well. No CNC machining is required in preparing the clamp mechanism of the invention and this enables greatly lower cost of manufacturing. Still further the clamp body may be extruded with or without the four (4) longitudinal holes shown on the end caps thereof, and the end caps can be separately made such that the holes are drilled into the body after the extruding operation is carried out.

With respect to the porting holes or apertures in the clamp mechanism, the pressure ports can be located in the extruded body or in the end caps 18 and 20. The porting holes can be from the sides, the front, or the back of the clamp body 12 or 112.

The internal workings of the clamp mechanism (for example as shown in the left side of FIG. 1, or in FIG. 6), enables a single unit assembly, namely the pneumatic piston rod and dividing plate to be assembled outside the body of the clamp, and then the whole unit assembly is inserted into the metal body of the clamp. Also the internal mechanism is either supported by the end cap 18 (or fasteners which are inserted through the body) to locate and hold the mechanism. The divider plate, or floating head member 34, is fastened to tracks 91 and 93 which in turn are fastened to the end cap 18. The roller bearings 65 are used to facilitate the release of the clamp from a wedge linkage locked condition (or from a toggle linkage locked condition). The piston rod clevis can be either a separate unit or machined or formed onto the end of the piston rod 32 (or 132) itself With respect to the drive shafts and/or bearings used to house the drive shaft, the drive shaft 40 is inserted through the body member 12 and through the driven plate. The drive shaft is generally made up of four parts instead of a single machining. Hardened steel bushings are pressed into the extruded body and centered, and then metal bearings are pushed over the square cross-section drive shaft to be seated (within the bushings) to thereby mount the drive shaft 40 for rotational movement, which in turn moves the clamp arm up-and-down from an open position to a locked position. The square drive shaft may need to be fastened to the drive plate with some means other than just a press fit to resist failure due to fatigue. If this is done small pins can be driven into the drive shaft to fasten it to the drive plate and this can be done just prior to closure of the upper cap member 18 onto the body member 12.

With respect to the cap member 18, on the wedge lock embodiment the cap supports the whole internal mechanism of track members, piston rod, floating head 34, and piston 30. The cap is made from a machining, investment casting, by a die casting, or by other similar process. The cap will have an opening through which a position sensor will be placed to monitor the extent to which the clamp arm is opened or closed to a locked position. The cap member 18 is then sealed off from the environment when the cap 18 is fixedly positioned to the end of the metal body member 12. In the toggle linkage embodiment, the cap 118 member takes up extensive loading generated during toggling so that high loading is not put on the aluminum extrusion, from which the metal body member 12 is preferably made.

With respect to the sensor unit, the sensor unit is inserted from the top of the clamp mechanism, unlike other clamps where the unit is inserted from the back or front. The sensor unit may include an angle of opening adjustment so that the clamp owner can easily remove the sensor, change the chicklet position, and adjust the angle of opening of the clamp arm at the same time. The clamp mechanism has space allotted for the sensor/angle of adjustment feature.

With respect to T-slot mounting, the extrusion shape of the body member 12 permits the use of a single T-slot 19 or multiple T-slots located in the body member 12 or the body member 112 to facilitate mounting thereof, see FIG. 18. This T-slot type mounting can replace or augment the technique of bolting and/or doweling the clamp to its work station.

A second alternate embodiment of a power clamp 210 according to the present invention is shown in FIGS. 12–16. The power clamp 210 includes an extruded clamp body 212 that generally has a rectangular shape. In this embodiment the clamp body 212 is an extruded metal material that includes an interior cavity 214 there through. In the second embodiment the shape of the interior cavity 214 is a true ellipse when viewed from an end or through cross section. It should be noted that the clamp body 212 can be extruded from any type of hard ceramic, plastic, aluminum or any other type of extrudable material but in the second embodiment metal is used. It should also be noted that in the preferred embodiment a rectangular shaped clamp body 212 is used but that any other shape capable of being extruded may be used depending on the clamp environment and design needs of the clamp operation. The extruded clamp body 212 also includes a plurality of orifices 216 on the sides of the clamp body 212. The orifices 216 are used to connect to the work piece being clamped or to receive and hold drive shafts or other components for the power clamp 210.

The power clamp 210 also includes an internal assembly which is inserted through one end of the clamp body 212 into the interior cavity 214. The internal assembly is a single unitary member that is assembled separate from and outside of the clamp 210 and is then inserted as a single unitary member into the clamp body 212 from the top end. The internal assembly includes a piston 230 connected to a piston rod 232 on one end of the piston rod 232. The piston rod 232 also has a head assembly 234 arranged on the opposite end of the piston rod 232 from the piston 230. The piston rod 232 has a reduced radius portion 231 on one end thereof where the piston 230 connects thereto. The piston 230 includes a first and second seal plate 233, 235 which surround a first and second piston plate 237, 239 and a first seal anti-extrusion plate 241. A first and second piston seal 243, 245 surround the outer edge or periphery of the piston 232 and are adjacent to the seal anti-extrusion plate 241. The piston 232 is arranged on the reduced radius portion 231 of the piston rod 232 and is secured by any known securing means 247 in contact with a shoulder of the reduced portion of the piston rod 231 and connected by the securing means 247 on the end opposite of the shoulder.

The head assembly 234 is arranged on the opposite end of the piston rod 232 from the piston 230 and includes a seal plate 249 engaging a piston plate 251 on one end thereof. On the opposite end of the piston plate 251 a seal anti-extrusion plate 253 is engaged therewith. A piston seal 255 is placed around the outside of the piston plate 251 while a rod seal 257 is arranged between the outer circumference of the piston rod 232 and the inner circumference of the piston plate 25 1. A track assembly 259 generally comprising a first and second track or channel 291, 293 which have their openings face one another is engaged with the seal anti-extrusion plate 253 of the head assembly 234 and is connected by any known means to the head assembly 234. On the opposite end of the track assembly or member 259 is a first and second rivet 261, 263 which are used to connect to a head cap 218. It should be noted that any other type of connecting device may be used, but in this embodiment a rivet is used.

A clevis 264 generally having a U-shape with an orifice 265 through each end thereof and an orifice 267 through its base is connected by any known securing means to the end of the piston rod 232 nearest the head assembly 234. The clevis 264 also includes a roller pin 201 arranged in the orifices 265 at the top end of the clevis 264 with a roller bearing 203 attached to each end of the roller pin 201 at the outside surface of the clevis 264. The clevis 264 is then inserted within the track assembly 259 such that the roller bearings 203 will roll along the first and second channels of the track assembly 259. The clevis 264 is also, via the orifice 267, connected via any known securing means 205, in the second embodiment a screw is used to the end of the piston rod 232 nearest the head assembly 234.

A drive plate 236 generally having a body 207 and an appendage 209 that extends therefrom is also a part of the internal assembly. The appendage 209 has a predetermined angle from a center line of the drive plate body 207. The appendage 209 also includes a shoulder portion 211 that creates a stop for the power clamp 210. The drive plate 236 has an orifice 213 through its body portion that mates with a drive shaft 240 male member for the power clamp 210. A channel 215 is located in the appendage 209 of the drive plate 236 and is arranged such that the roller pin 201 is placed through the channel 215 and allows for the drive plate 236 to be connected to the clevis 264 which is located within the track assembly 259. It should also be noted that a toggle link may also be used according to this second alternate embodiment.

The power clamp 210 also includes in the second alternate embodiment a two piece drive shaft 240 that generally has a square cross section, however it should be noted that any other type of shape such as round or any other known shape may be used for the drive shaft 240. The second alternate embodiment also could use a one piece drive shaft 240 or any other number of pieces depending on the design and needs of the clamp environment. The first and second members 217, 219 of the drive shaft 240 engage with and are non-rotatably secured within the orifice 213 of the drive plate 236 such that any rotational movement of the drive shaft 240 will also cause rotation of the drive plate 236. The drive shaft 240 is supported within the clamp body 210 by a first and second bushing 251 and a first and second bearing 250. The bushing 251 and bearings 250 are located through a first and second orifice 242, 244 on the sides of the clamp body 212. In the second embodiment the bearings 250 are made of a Teflon material but any other known type of bearing may also be used depending on the design and needs of the power clamp 210 and its environment. The first member 217 of the drive shaft 240 includes an orifice through the entire length thereof The second member 219 of the drive shaft 240 includes a threaded orifice through a predetermined portion. After insertion in the power clamp 210, any known securing means, a screw 221 in this embodiment is placed through the first member 217 of the drive shaft and secured into the second drive shaft member 219.

The power clamp 210 also includes an end cap 220 located on a bottom end of the clamp body 212. The end cap 220 is sealed by a gasket 223 between the end cap 220 and the clamp body 212. In the second alternate embodiment the internal unitary assembly is placed through the top end of the extruded body clamp 212 into the interior cavity 214 until the piston rod 232 engages with the end cap 220 of the clamp body 212. Then the drive shaft 240 is inserted through the first and second orifice 242, 244 of the clamp body 212 and its two pieces 217, 219 are connected to each other and supported by the bearings 250 and bushings 251. The two pieces 217, 219 also engage with and are secured within the orifice 213 of the drive plate 236. Finally, a head cap 218 is connected to the clamp body 212 after being centered by any known appropriate means to the center line of the ellipse or other shape of the cavity. It should be noted that the cavity in the second alternate embodiment is a true ellipse but that any other known shape such as a circle or oval or any other known extrudable shape may be used. The head cap 218 is connected by rivets 261, 263 to the end of the track assembly 259 opposite the head assembly 234. A gasket may also be used between the head cap 218 and the end of the clamp body 212.

After completion of the assembly of the clamp 210 a clamp arm 66 is connected via the first and second bushings 251 to the drive shaft 240, thus allowing for automatic or manual operation of the power clamp 210 by a computer, machine or manual operation. In operation when the clamp is in an open position the piston 230 is located near the end cap 220, within the cavity portion defined as the piston chamber 280. The piston chamber 280 is defined by the head assembly 234 and the end cap 220. When the clamp 210 is put into its closed position the clamp arm 66 is rotated by a rotation of the drive shaft 240. The drive shaft 240 is rotated by the drive plate 236, i.e., the roller pin 201 will move within the channel 215 of the drive plate appendage 209 until the shoulder portion 211 of the appendage contacts a surface of the head cap 218. Once the shoulder portion contacts the surface of the head cap 218 a positive stop for the power clamp 210 is created thus securing the power clamp 210 in its closed position. The piston 230 will slide axially towards the head assembly 234 when the power clamp 210 is moving to its closed position, due to the hydraulic pressures acting on the piston 230, those pressures will also hold the power clamp 210 in its closed position. Therefore, the design of the clamp 210 can be changed such that the angle of the channel through the appendage 209 of the drive plate 236 creates a quicker movement towards the positive stop of the power clamp 210 thus reducing the axial movement of the piston 230 within the piston chamber 280 and reducing the forces necessary to hold the clamp or increase the forces necessary to hold the clamp in a closed position. The roller bearings 203 and clevis 264 have axial movement within the track assembly 259 due to the forces being translated by the piston rod 232.

In assembling the power clamp 210 according to the second alternate embodiment, first the metal body 212 is extruded with an ellipse shaped cavity 214 there through. Next, the internal clamp assembly is assembled and the head cap 218 is attached to an end of the track member 259. Next, the end cap 220 is connected to the clamp body 212 on a bottom end of the clamp body. Then, the one unitary internal clamp assembly, which was pre-built, is inserted through the top end of the clamp body 212 into the cavity 214 until the end of the piston rod 232 engages the inside surface of the end cap 220. Then, the drive shaft 240 is inserted into the clamp body 212 and engages with the drive plate 236 of the internal clamp assembly such that the drive plate 236 is non-rotatably connected to the drive shaft 240. Finally, the head cap 218 is secured to the clamp body 212 by positioning the head cap 218 with respect to the center line of the ellipse of the interior cavity 214 and not by the outer surfaces of the head cap 218 with respect to the outer surfaces of the clamp body 212.

Figure 17:
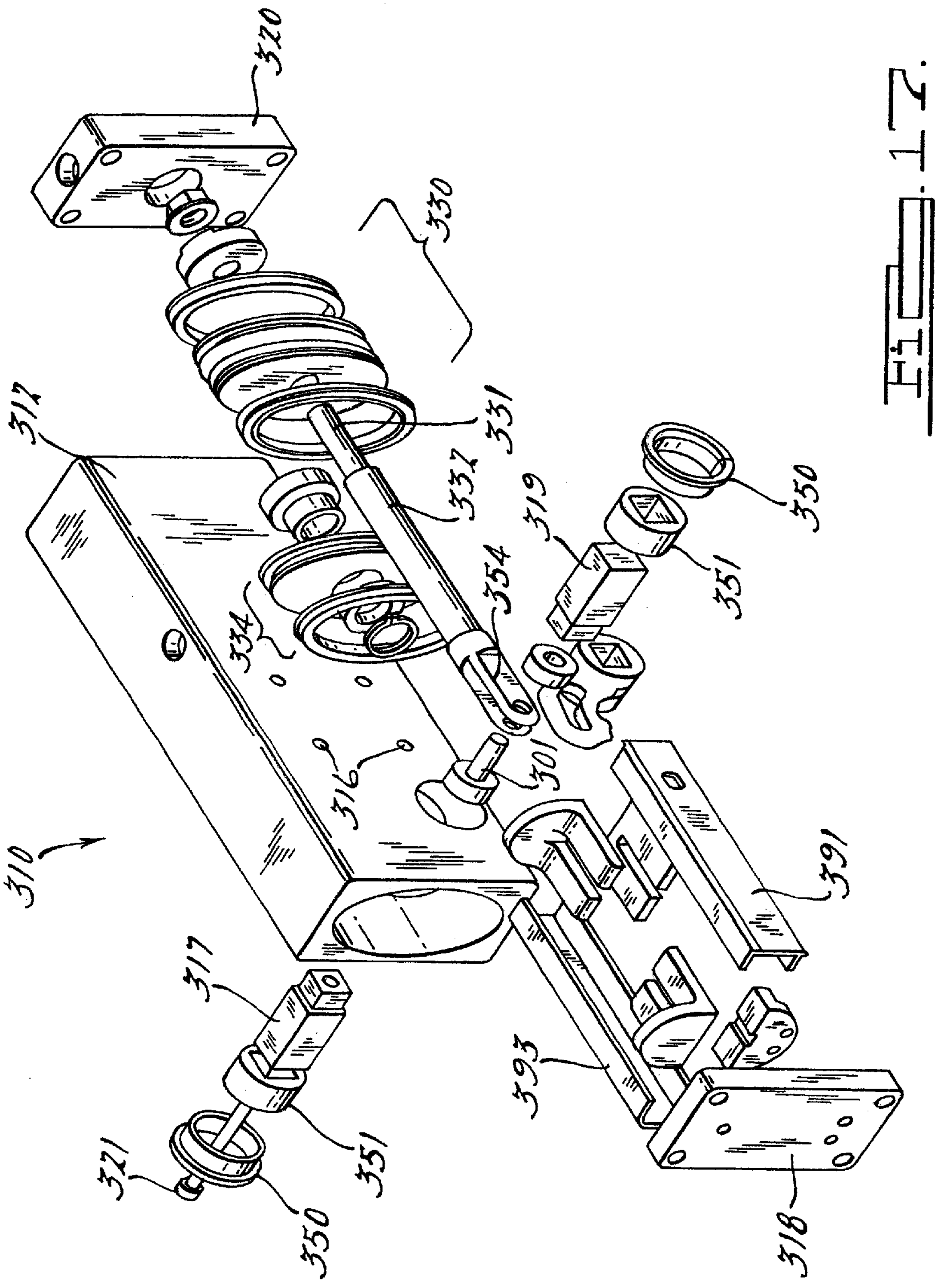
FIG. 17 shows an exploded view of a third alternate embodiment of the power clamp.

FIG. 17 shows a third alternate embodiment of the clamp 310 according to the present invention and operates in the same manner as that described for FIGS. 12–16.

While it will be apparent that the preferred embodiments of the invention disclosed are well calculated to fulfill the objects, benefits, and/or advantages of the invention, it will be appreciated that the invention is susceptible to modification, variation and change without departing from the proper scope or fair meaning of the subjoined claims.

What is claimed is:

1. A power clamp apparatus, comprised of, a single metal body with an interior cavity running there through a unit assembly which is inserted into said interior cavity, and said unit assembly including;

a piston for slidable back and forth movement within said cavity;

a lower portion of said cavity acting as a chamber for said piston;

a piston rod connected to said piston;

a floating head member on the piston rod;

a link mechanism connected proximate to an upper end of said piston rod;

a lower cap member which closes off said cavity near a bottom end of said metal body;

an upper cap member which closes off the metal body proximate to a top end thereof after said unit assembly is inserted into said cavity;

a drive shaft inserted through apertures in a generally transverse position through said metal body, with a central portion of said drive shaft inside the metal body being connected to an end of said link mechanism;

a clamp arm attached to said drive shaft on the outside of said metal body; and wherein when said piston rod attached to said link mechanism is moved from its retracted position to its extended position, it causes the clamp arm to be moved between an open position and a clamped positioned relative to a work piece being clamped.

2. The clamp apparatus of claim 1 wherein said link mechanism is a wedge lock link mechanism.

3. The clamp apparatus of claim 1 wherein said link mechanism is a toggle link mechanism.

4. The clamp apparatus of claim 1 wherein said metal body is made of a material selected from at least one of the group consisting of an extruded metal and a machine formed metal.

5. The clamp apparatus of claim 1 wherein the unit assembly of piston, piston rod, floating head member, and link mechanism are assembled outside the metal body and then inserted into the metal body.

6. The clamp apparatus of claim 1 wherein the unit assembly also includes at least one track member which mates proximate with an upper end of the piston rod to guide same in its back and forth movement in said cavity.

7. The clamp apparatus of claim 1 wherein porting conduits are included near the bottom of the apparatus and proximate to a mid-point thereof, to provide for introduction of a pressurized fluid to both sides of said piston to effect back and forth movement thereof.

8. The clamp apparatus of claim 5 wherein said unit assembly is supported by said upper cap member for insertion of the unit assembly into the metal body.

9. The clamp apparatus of claim 6 wherein said floating head member once inserted into said cavity is held in a fixed position therein by attachment of said head member to said track member.

10. The clamp apparatus of claim 1 wherein roller bearings are included in the unit assembly proximate to a top end of said piston rod to facilitate release of the clamp arm from a locked condition.

11. The clamp apparatus of claim 1 wherein the upper cap member has an opening through which a position sensor is inserted into the interior of the metal body.

12. The clamp apparatus of claim 3 wherein said upper cap member is made of a high strength steel to take up more extensive load forces in the toggle link mechanism.

13. The clamp apparatus of claim 11 wherein said position sensor includes an angle of opening adjustment member which adjustment member can be moved to thereby adjust an angle of opening for the clamp arm.

14. The clamp apparatus of claim 1 wherein said metal body includes at least one T-slot on an exterior surface thereof to facilitate mounting of the clamp apparatus.

15. The clamp apparatus of claim 1 wherein a plurality of mounting holes are formed in the exterior of the metal body to facilitate mounting of the clamp apparatus.

16. The clamp apparatus of claim 1 wherein said drive shaft is mounted through the usage of steel bushings which are pressed into opposing sides of the metal body and metal bearings which are placed over a cross-section of the drive shaft.

17. A power clamp apparatus, comprised of, an extruded metal body with an interior cavity running there through;

a unit assembly which is inserted into said interior cavity, and said unit assembly including;

a piston for slidable back and forth movement within said cavity;

a lower portion of said cavity acting as a chamber for said piston;

a piston rod connected to said piston;

a floating head member on the piston rod;

a link mechanism connected proximate to an upper end of said piston rod;

a lower cap member which closes off said cavity near a bottom end of said metal body;

an upper cap member which closes off the metal body proximate to a top end thereof after said unit assembly is inserted into said cavity;

a drive shaft inserted through apertures in a generally transverse position through said metal body, with a central portion of said drive shaft inside the metal body being connected to an end of said link mechanism;

a clamp arm attached to said drive shaft on the outside of said metal body; and wherein when said piston rod attached to said link mechanism is moved from its retracted position to its extended position, it causes the clamp arm to be moved between an open position and a clamped positioned relative to a work piece being clamped.

18. The clamp apparatus of claim 17 wherein said link mechanism is a wedge lock link mechanism.

19. The clamp apparatus of claim 17 wherein said link mechanism is a toggle link mechanism.

20. The clamp apparatus of claim 17 wherein the unit assembly of piston, piston rod, floating head member, and link mechanism are assembled outside the metal body and then inserted into the metal body.

21. The clamp apparatus of claim 17 wherein the unit assembly also includes at least one track member which mates proximate with an upper end of the piston rod to guide same in its back and forth movement in said cavity.

22. The clamp apparatus of claim 17 wherein porting conduits are included near the bottom of the apparatus and proximate to a mid-point thereof, to provide for introduction of a pressurized fluid to both sides of said piston to effect back and forth movement thereof.

23. The clamp apparatus of claim 20 wherein said unit assembly is supported by said upper cap member for insertion of the unit assembly into the metal body.

24. The clamp apparatus of claim 21 wherein said floating head member once inserted into said cavity is held in a fixed position therein by attachment of said head member to said track member.

25. The clamp apparatus of claim 17 wherein roller bearings are included in the unit assembly proximate to a top end of said piston rod to facilitate release of the clamp arm from a locked condition.

26. The clamp apparatus of claim 17 wherein the upper cap member has an opening through which a position sensor is inserted into the interior of the metal body.

27. The clamp apparatus of claim 19 wherein said upper cap member is made of a high strength steel to take up more extensive load forces in the toggle link mechanism.

28. The clamp apparatus of claim 26 wherein said position sensor includes an angle of opening adjustment member which adjustment member can be moved to thereby adjust an angle of opening for the clamp arm.

29. The clamp apparatus of claim 17 wherein said metal body includes at least one T-slot on an exterior surface thereof to facilitate mounting of the clamp apparatus.

30. The clamp apparatus of claim 17 wherein a plurality of mounting holes are formed in the exterior of the metal body to facilitate mounting of the clamp apparatus.

31. The clamp apparatus of claim 17 wherein said drive shaft is mounted through the usage of steel bushings which are pressed into opposing sides of the metal body and metal bearings which are placed over a cross-section of the drive shaft.

32. A power clamp apparatus, comprised of, a single body with an interior cavity running there through;

a unit assembly which is inserted into said interior cavity, and said unit assembly including;

a piston for slidable back and forth movement within said cavity;

a lower portion of said cavity acting as a chamber for said piston;

a piston rod connected to said piston;

a floating head member on the piston rod;

a link mechanism connected proximate to an upper end of said piston rod;

a lower cap member which closes off said cavity near a bottom end of said metal body;

an upper cap member which closes off the metal body proximate to a top end thereof;

a drive shaft inserted through apertures in a generally transverse position through said metal body, with a central portion of said drive shaft inside the metal body being connected to an end of said link mechanism;

a clamp arm attached to said drive shaft on the outside of said metal body;

and wherein when said piston rod attached to said link mechanism is moved from its retracted position to its extended position, it causes the clamp arm to be moved between an open position and a clamped positioned relative to a work piece being clamped.

33. The clamp apparatus of claim 32 wherein said link mechanism is a wedge lock link mechanism.

34. The clamp apparatus of claim 32 wherein said link mechanism is a toggle link mechanism.

35. The clamp apparatus of claim 32 wherein said metal body is made of a material selected from at least one of the group consisting of an extruded metal and a machine formed metal.

36. The clamp apparatus of claim 32 wherein the unit assembly of piston, piston rod, floating head member, and link mechanism are assembled outside the metal body and then inserted into the metal body.

37. The clamp apparatus of claim 32 wherein the unit assembly also includes at least one track member which mates proximate with an upper end of the piston rod to guide same in its back and forth movement in said cavity.

38. The clamp apparatus of claim 32 wherein porting conduits are included near the bottom of the apparatus and proximate to a mid-point thereof, to provide for introduction of a pressurized fluid to both sides of said piston to effect back and forth movement thereof.

39. The clamp apparatus of claim 32 wherein said unit assembly is supported by said upper cap member for insertion of the unit assembly into the metal body.

40. The clamp apparatus of claim 32 wherein said floating head member once inserted into said cavity is held in a fixed position therein by attachment of said head member to said track member.

41. The clamp apparatus of claim 32 wherein roller bearings are included in the unit assembly proximate to a top end of said piston rod to facilitate release of the clamp arm from a locked condition.

42. The clamp apparatus of claim 32 wherein the upper cap member has an opening through which a position sensor is inserted into the interior of the metal body.

43. The clamp apparatus of claim 32 wherein said upper cap member is made of a high strength steel to take up more extensive load forces in the toggle link mechanism.

44. The clamp apparatus of claim 42 wherein said position sensor includes an angle of opening adjustment member which adjustment member can be moved to thereby adjust an angle of opening for the clamp arm.

45. The clamp apparatus of claim 32 wherein said metal body includes at least one T-slot on an exterior surface thereof to facilitate mounting of the clamp apparatus.

46. The clamp apparatus of claim 32 wherein a plurality of mounting holes are formed in the exterior of the metal body to facilitate mounting of the clamp apparatus.

47. The clamp apparatus of claim 32 wherein said drive shaft is mounted through the usage of steel bushings which are pressed into opposing sides of the metal body and metal bearings which are placed over a cross-section of the drive shaft.

48. A power clamp, said clamp including:

a unitary body extruded from a predetermined material, said body having a cavity there through;

an internal assembly arranged within said cavity;

said internal assembly including:

a piston movable within said cavity;

a piston rod connected to said piston;

a drive plate connected to said piston rod;

a drive shaft non-rotatably connected to said drive plate;

a track arranged within said cavity to receive said piston rod therein;

an end cap attached to a bottom end of said body;

a head cap attached to a top end of said body, said track is secured to said head cap; and an arm connected to said drive shaft.

49. The power clamp of clam 48 wherein said drive shaft having a first and second member.

50. The power clamp of claim 48 wherein said internal assembly is a separate unitary component, said internal assembly is inserted in said cavity through said top end of said body.

51. The power clamp of claim 48 wherein said cavity having a true ellipse shape.

52. The power clamp of claim 51 further including a plurality of seals within said cavity, said seals having a round shape.

53. The power clamp of claim 48 wherein said drive plate having an appendage.

54. The power clamp of claim 53 wherein said appendage creates a positive stop for the clamp by contacting said head cap.

55. A clamp, said clamp including:

a metal unitary extruded body with an interior cavity, said body having a top and bottom end;

a unitary internal assembly inserted into said interior cavity;

said unitary internal assembly including:

a piston slidable in an axial direction in a portion of said cavity;

a piston rod connected to said piston on one end thereof;

a head member arranged on said piston rod on an end opposite of said piston;

a track member connected to said head member on one end and engaging said head cap on an opposite end thereof;

a clevis connected to an end of said piston rod; and a drive plate connected to said clevis at an end opposite of said rod;

a drive shaft rotatably supported within said body;

an end cap secured to said bottom end of said body;

a head cap secured to said top end of said body; and an arm secured to said drive shaft.

56. The clamp of claim 55 wherein said drive shaft having a first and second member, said drive shaft is connected to said drive plate.

57. The clamp of claim 56 wherein said drive plate rotates within a channel of said track member due to axial movement of said clevis within said track member which is axially moved by said piston rod and said piston until said drive plate engages said head cap at a positive stop.

58. The clamp of claim 56 wherein said drive shaft is supported by a first and second Teflon bearing and a first and second bushing in a first and second orifice of said body.

* * * * *